(12) United States Patent
Blumental (10) Patent No.: US 6,793,619 B1
(45) Date of Patent: Sep. 21, 2004

(54) COMPUTER-IMPLEMENTED METHOD AND SYSTEM FOR GIVING A USER AN IMPRESSION OF TACTILE FEEDBACK

(76) Inventor: Yaacov Blumental, 20 Efronis St., Rosh Haayin 40800 (IL)

( * ) Notice: Subject to any disclaimer, the term of this patent is extended or adjusted under 35 U.S.C. 154(b) by 0 days.

(21) Appl. No.: 09/328,392

(22) Filed: Jun. 9, 1999

(51) Int. Cl.[7] ................................................. A61F 5/00
(52) U.S. Cl. ......................................................... 600/38
(58) Field of Search ...................... 600/38–41; 434/114, 434/118, 247, 257, 262, 225, 303 R, 315, 316, 423

(56) References Cited

U.S. PATENT DOCUMENTS

| | | |
|---|---|---|
| 4,771,344 A * | 9/1988 | Fallacaro et al. ........... 358/335 |
| 4,954,697 A | 9/1990 | Kokubun et al. |
| 5,174,759 A | 12/1992 | Preston et al. |
| 5,515,424 A | 5/1996 | Kenney |
| 5,739,811 A | 4/1998 | Rosenberg et al. |
| 5,844,547 A | 12/1998 | Minakuchi et al. |
| 5,845,263 A | 12/1998 | Camaisa et al. |

FOREIGN PATENT DOCUMENTS

| | | | | |
|---|---|---|---|---|
| WO | 88/06077 | * | 8/1988 | ................... 600/38 |

OTHER PUBLICATIONS

Web Cast, Virtual Sex Machine, Cyber Love, /the sync/, Dec. 1998.*

* cited by examiner

*Primary Examiner*—John P. Lacyk
(74) *Attorney, Agent, or Firm*—Browdy and Neimark, P.L.L.C.

(57) ABSTRACT

A computer-implemented method and system for giving a user an impression of tactile feedback, comprising a computer coupled to a memory storing therein a plurality of computer-accessible movie sequences of at least one image relating to a predetermined subject. An appliance is associated with the at least one image, and at least one data input source is associated with the appliance for inputting tactile-dependent signals to the computer. A display device is connected to the computer for displaying one of the movie-sequences in accordance with the tactile-dependent signals.

57 Claims, 5 Drawing Sheets

COMPUTER-IMPLEMENTED METHOD AND SYSTEM FOR GIVING A USER AN IMPRESSION OF TACTILE FEEDBACK

FIELD OF THE INVENTION

This invention relates to interactive display and manipulation of computer images.

BACKGROUND OF THE INVENTION

The need for interactive display and manipulation of computer images has been extensively addressed in the patent literature. U.S. Pat. No. 5,844,547 discloses an apparatus and a method of operation for manipulating the display of an object on a display device in accordance with sensing a touching contact on a touch pane, superimposed on a display surface of the display device. Movement of the displayed object is simulated in accordance with characteristics of the touching contact on the touch panel adjacent to the displayed object image. Further, object data defining the display of the object image for each of a plurality of different states of the object, display information specifying the shape and physical properties of the object and the current display position thereof and file information relating to the stored data are stored and accessed for interpreting the simulated manipulation of the object by the characteristics of the touching contact therewith, for correspondingly manipulating and displaying the thus manipulated object image.

U.S. Pat. No. 5,174,759 discloses a TV animation interactively controlled by the viewer through input above a book page. A video system enables the operator to repeatedly touch a study object to change the action according to dramatics or game on a video display.

U.S. Pat. No. 5,515,424 discloses a system and method for providing selected video images to local telephone stations. Subscriber selected advertising is provided in the form of video images to a local telephone station. The telephone network includes a telephone line system and switch facility contained within the line system for forwarding calls made by a calling party from a local telephone station through the telephone line system to a destination point. The local telephone station is interfaced with the network. The phone includes a display monitor for receiving data corresponding to video images and displaying same. The images are stored in a central database and compressed into data packets of lesser bandwidth for transmission from the database through a network interface and into the existing telephone line system packet form to the local telephone station where they are arranged and decompressed for display on the monitor. A plurality of telephone stations can be grouped into a cluster unit. In this format, video data is preferably compressed, multiplexed, transmitted over the telephone network, demultiplexed and then decompressed for display at respective monitors. Interaction with a caller is effected via a selected touch tone sequence made by the caller for routing the call to the image database for selecting and transmitting to the local telephone station preselected video images.

U.S. Pat. No. 5,739,811 discloses a method and apparatus for controlling human-computer interface systems providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters.

U.S. Pat. No. 5,845,263 discloses an interactive visual ordering system particularly for restaurants for facilitating ordering menu items by a customer. The customer can request the system to display full-color images of a menu item as a help to decide what to order. The customer can also obtain a list of ingredients, method of preparation and nutritional information for a selected menu item. The system includes a portable computer including a data input device; a video monitor electronically connected to the computer; and a set of photo-realistic images digitally accessible to the computer. A set of food item characteristics is digitally accessible to the computer and presentable in alphanumeric form, wherein at least some of the characteristics are associated with at least one of the images. The computer is adapted to display one or more of the images and one or more of the characteristics associated with the image or images on the monitor in response to manipulation of the data input device.

U.S. Pat. No. 4,954,697 shows a vending apparatus for a self-service store comprising a memory for storing product data associated with a plurality of different stored items, the product data including multiple displays of more precise product information on successive screen images for display on a display panel. An input means includes a touch sensing input device on the display panel and allows selection and designation data to be received from a user indicative of selected products.

These references are typical of systems allowing image manipulation using touch sensitive sensors. However, the touch sensors merely serve to allow user selection of pre-stored characteristics and do not actually provide the user with an impression of tactile feedback. Tactile feedback is important in a large number of circumstances. For example, tactile feedback provides valuable information about saleable products which is not assessable from mail order catalogues be they in printed form or computer implemented. For instance, the "feel" of cloth is important when purchasing clothes, particularly, albeit not exclusively, lingerie.

Tactile feedback may also form an essential component of sex therapy. It is known that sexual dysfunction is commonly psychological rather than physiological on the gradual building up of a patient's self-confidence, using various means for inducing sexual stimulation. Short of using surrogate partners, which is an extreme and often unacceptable approach, little has been offered to simulate the sensation of feel, notwithstanding its crucial importance in real life.

SUMMARY OF THE INVENTION

It is an object of the invention to give a user an impression of tactile feedback which allows visual images to be manipulated according to the manner in which the user contacts one or more touch-sensitive switches.

According to a first aspect of the invention, there is provided a computer-implemented method for giving a user an impression of tactile feedback, the method comprising the steps of:

(a) storing a plurality of computer-accessible movie sequences of at least one image relating to a predetermined subject, (b) providing to the user an appliance associated with said at least one image, (c) using said appliance to input tactile-dependent signals to the computer, and (d) displaying on a display device connected to the computer one of said movie-sequences in accordance with said tactile-dependent signals.

Unlike the prior art, the tactile-dependent signals are not used to select pre-stored images on a one-to-one basis but rather allow selection of pre-stored images according to the order, rate and/or pressure with which a sequence of touch sensors are contacted. Moreover, in the prior art, there appears to be no suggestion that an appliance may be associated with an image to be displayed such that the appliance allows for the communication of tactile-dependent signals to the computer which processes the image. Thus, the prior art merely teaches the use of touch panels, for instance, for selecting an image to be displayed. Several touch panels or touch-sensitive areas of a display device have also been provided, each for selecting a different respective image to be displayed. However, the display of movie or animated image sequences based on sequential contact of a plurality of touch panels or touch-sensitive elements has not been proposed hitherto. Most important, the invention provides tactile feedback that reinforces the actual sensation of feel associated, for example, with a particular texture.

BRIEF DESCRIPTION OF THE DRAWINGS

In order to understand the invention and to see how it may be carried out in practice, some preferred embodiments will now be described, by way of non-limiting example only, with reference to the accompanying drawings, in which:

FIGS. 4a to 8 are pictorial representations of different appliances for use with the system shown in FIG. 1 according to further embodiments of the invention.

DETAILED DESCRIPTION OF PREFERRED EMBODIMENTS

Figure 1:
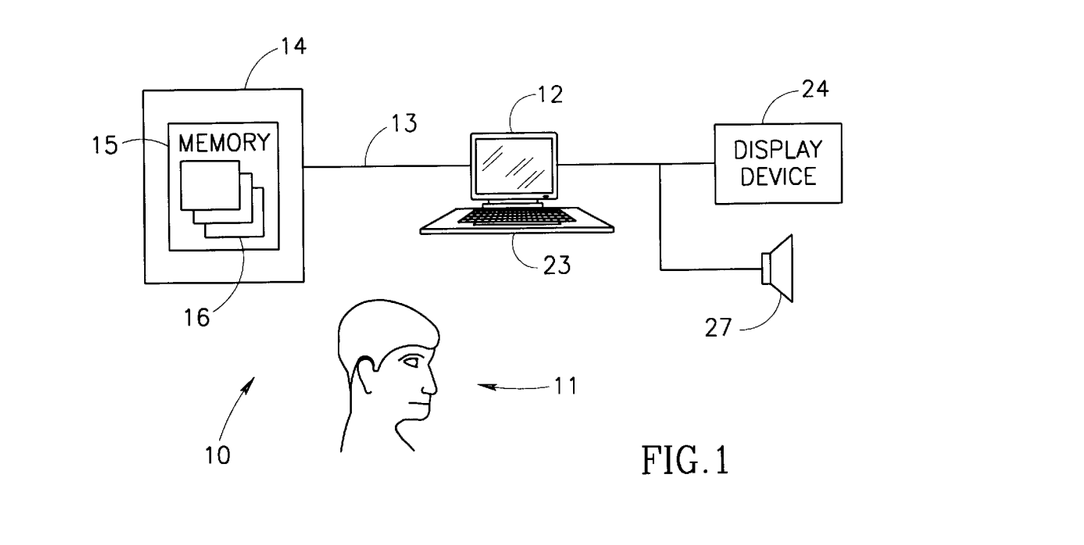
FIG. 1 is a block diagram showing functionally a system according to the invention.
Figure 2:
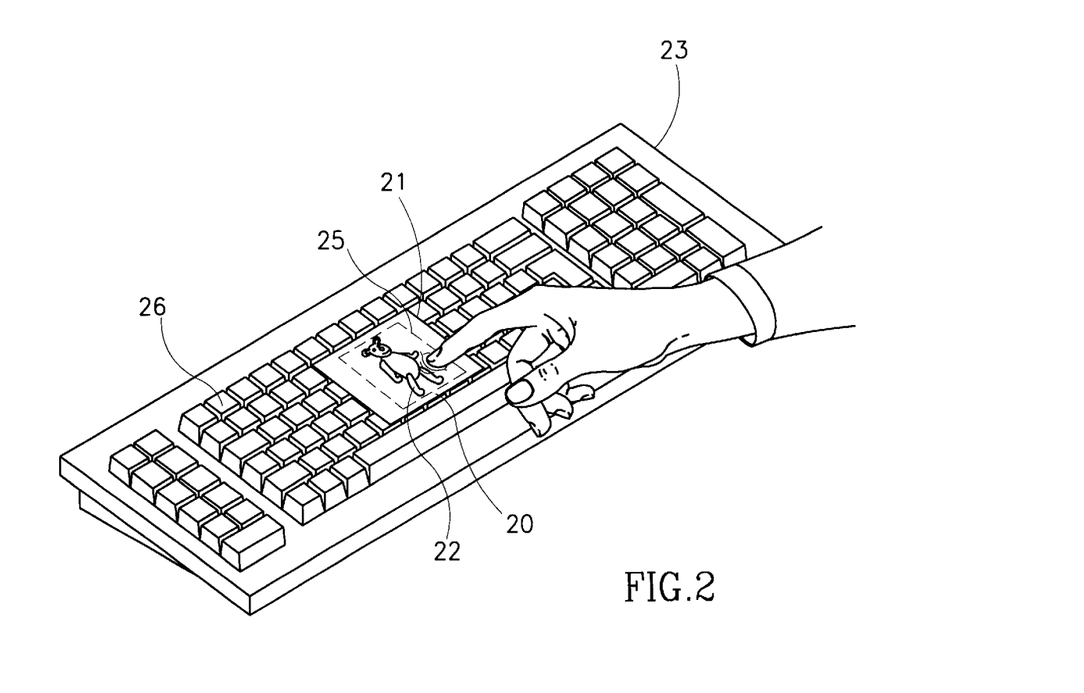
FIG. 2 is a pictorial representation of an appliance for use with the system shown in FIG. 1 according to a first embodiment of the invention.

FIGS. 1 and 2 show a computer-implemented system depicted generally as 10 for giving a user 11 an impression of tactile feedback. The system 10 comprises a computer 12 coupled via a communication line 13 through the Internet to a server 14 having a memory 15 storing therein a plurality of computer-accessible movie sequences 16 of at least one image relating to a predetermined subject. For the sake of clarity, it will be supposed that a clothes manufacturer or supplier wishes to sell his wares over the Internet. To this end, he sets up a site and stores at least one image relating to a specific article of clothing. More typically, he would want to show the article of clothing being worn as seen by an observer from various angles, and thus stores a plurality of images which, when displayed in quick succession, give the impression of a movie-sequence of a model or mannequin moving or pirouetting whilst wearing the article of clothing.

The user, in this case a potential customer, is provided with an appliance 20 associated with the image of the article of clothing depicted by the movie sequence. According to a first embodiment of the invention, the appliance 20 is a card 21 (constituting a substantially planar membrane) bearing a pictorial representation 22 of a corresponding article of clothing or movie-sequence. In such case, the user 11 acquires a collection of such cards 21 each depicting, for example, a different article of clothing in the manufacturer's or supplier's catalogue.

A keyboard 23 is coupled to the computer 12 and constitutes a data input source for inputting tactile-dependent signals to the computer 12; and a display device 24 is connected to the computer 12 for displaying one of the movie-sequences in accordance with the tactile-dependent signals. The appliance 20 includes at least one flexible area 25 therein for overlapping a predetermined sequence of keys 26 of the keyboard 23 connected to the computer 12. Applying pressure to the appliance 20, for example by the user 11 brushing a finger across an external surface thereof within the flexible area 25, successively depresses the predetermined sequence of keys 26 in an order dependent on the direction in which the user's finger brushes across the external surface of the appliance. The computer 12 is adapted to extract one of the movie-sequences responsive to depressing said predetermined sequence of keys and to display successive images so as to give the desired impression of motion. By arranging that the flexible area 25 in different cards 21 overlies different sequences of keys 26, the location of the flexible area serves for encoding the respective card and signals to the computer 12 which movie sequence to display. Which images in the selected movie sequence are actually displayed and the order in which they are displayed is determined according to the order in which the keys are depressed and, possibly, also the rate of depression.

Further, seeing that different locations of the card 21 overlie specific keys 26, the computer 12 is responsive to discrete points of contact by the user 11 with the card 21 for displaying a respective image of the movie-sequence. More particularly, the computer 12 may be responsive to successive points of contact by the user with the pictorial representation for displaying respective successive images of the selected movie-sequence, and each of the respective successive images may depict contact with the pictorial representation at a respective point of contact. In such manner, the movie-sequence mirrors the user's contact with the pictorial representation. For example, the card 21 may bear a pictorial representation of a toy teddy bear. A child strokes the head of the teddy bear depicted in the pictorial representation, thus activating a specific sequence of keys 26. The computer 12 responds to the specific sequence of keys 26 thus activated to display a sequence of images of a "virtual" child stroking a teddy bear at the same location, thus mirroring the action of the child. If desired, a portion of the card 21 within the flexible area 25 may be contoured so as to resemble more closely a feature of the teddy bear (or other image) depicted thereon. Furthermore, sound files may be downloaded from the Web site or CD-ROM to the computer 12 for vocalization by a loudspeaker 27 coupled thereto. The invention thus provides tactile feedback that reinforces the actual sensation of feel associated, for example, with a particular texture, since the child will gain the impression that he is actually stroking the fur coat of a real teddy bear.

In like manner the pictorial representation and the movie-sequence may depict erotic images. In this case, for example, the card 21 may depict part of a woman's anatomy which, when stroked by the user 11, results in a movie sequence of images being displayed showing a model performing similar motions On her own body. If desired, a portion of the card 21 within the flexible area 25 may be contoured so as to resemble more closely the part of the woman's anatomy depicted thereon. Here also sound data may be downloaded for vocalization by a loudspeaker 27. Strategic areas of the pictorial representation may be covered with fabric having erotic connotations such as chiffon or silk and conjuring up lingerie in the user's mind. The movie sequence thus obtained in consequence to rubbing these areas provides tactile feedback that gives the user the impression that he is actually feeling the lingerie on the displayed model.

Figure 3A:
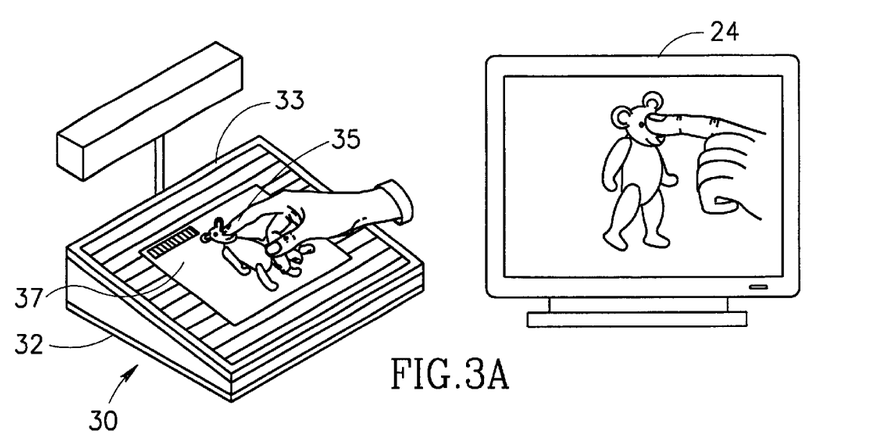
FIG. 3 is a pictorial representation of an alternative data input source for use with the system shown in FIG. 1.
Figure 3B:
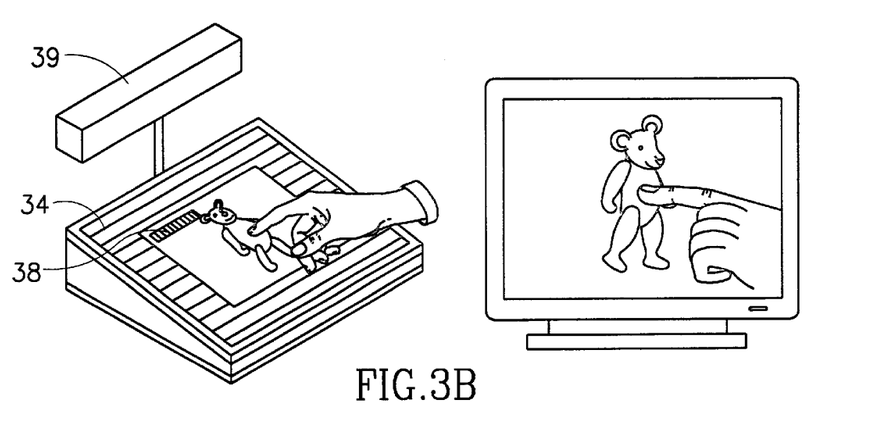
Figure 3C:
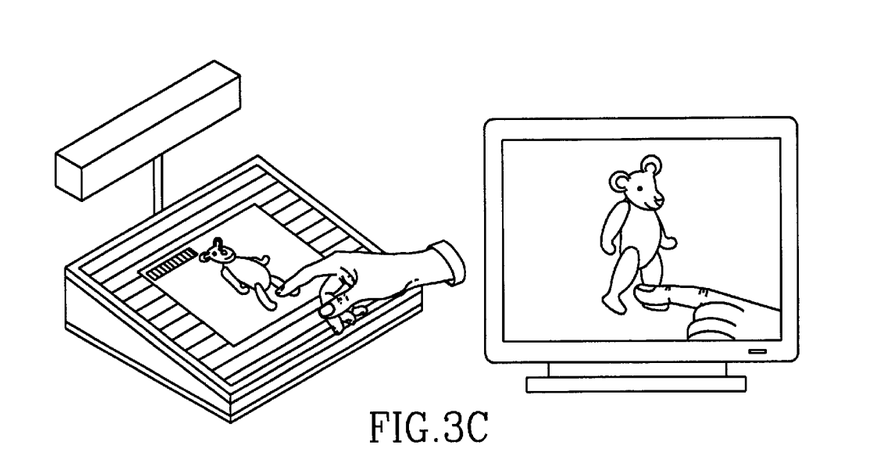

FIGS. 3a to 3c show pictorially an alternative data input source that may be used instead of, or in addition to, the keys 26 shown in FIG. 2. The data input source comprises a capacitive sensor 30 having a base plate 32 and a non-parallel tablet 33 displaced therefrom, both formed of metal and each being divided into mutually separate sections 34. The capacitance between the base plate 32 and the tablet 33 for each section is a function of their mutual separation and thus varies according to the location along the section. The same effect could be achieved by employing parallel plates separated by a non-linear dielectric.

In use, a user contacting the sensor 30 with his finger 35 applies slight pressure to the tablet 33 thereby slightly displacing one of the sections 34 toward the base plate 32. The sensor 30 is connected in one arm of a capacitive meter 36, which thus produces an output signal whose magnitude is a function of the capacitance between the base plate 32 and the tablet 33 of the depressed section 34. This is a function of displacement of the user's finger 35 along the tablet 33, and thus of displacement along one axis of the tablet relative to an origin thereof, owing to the approximately linear relationship between the two. Knowledge of which section 34 is depressed provides a measure of the displacement along an orthogonal axis of the tablet, thus allowing both coordinates to be determined.

According to one application of this embodiment, a picture 37 may be mounted on the tablet 33 such that movement of the user's finger 35 along the picture translates into a varying signal that is fed to the computer 12. Associated with the picture 37 is a barcode 38 that is read by a barcode reader 39, which produces an identification signal identifying the picture 37. The computer 12 is responsive to the identification signal for accessing a library of pre-stored images corresponding to the picture 37 and is programmed to display one of the stored images according to the varying sensor signal. FIGS. 3a, 3b and 3c show pictorially how movement of the user's finger 35 across the picture 37 of a teddy bear translates to the display of different frames of a movie sequence of a walking teddy bear on the display device 24. Thus, FIG. 3a shows a first situation where a user touches the picture 37 towards the teddy bear's head and there is shown on the display device 24 a first frame showing a hand stroking a teddy bear at the same point. In FIG. 3b, the user's finger 35 has progressed towards the middle of the teddy bear, and there is likewise displayed a subsequent frame on the display device 24 wherein the hand has moved to the same point of the teddy bear. In FIG. 3c, the user's finger 35 has progressed towards the teddy bear's foot, and there is displayed a subsequent frame on the display device 24 wherein the hand is touching the teddy bear's foot.

By way of further example, the picture 37 may be a calendar or other promotional material supplied by a company having a Web site. At the Web site there is stored a plurality of movie sequences depicting movement of the calendar image. The user mounts the calendar image on the tablet 33 and connects to the company's Web site whereupon there is displayed on the display device 24 the same image as shown on the calendar. As the user moves his or her finger 35 along the tablet 33, the display image varies giving the impression of a movie-sequence. In particular, images may be displayed depicting motion of the user's finger at a specific location of the calendar image. For example, the calendar image may show a model advertising a hair conditioner. Movement of the user's finger 35 in an area of the model's head, may show on the display device 24 swaying motion of the model's hair. According to another application, erotic images of the model may be displayed showing a desired area of her anatomy according to the location of the user's finger 35 on the calendar image.

According to yet another application sports personalities may be shown on the card. Applying finger pressure on a selected personality causes a movie sequence to be displayed depicting the selected personality playing the sport with which he is associated. This also has application as an educational aid. For example, touching one of several musicians depicted in a pictorial representation mounted on the tablet, might result in a movie sequence of the selected musician playing music which is heard through the loudspeaker 27.

The tablet 33 may also be used in conjunction with other sensors so as to provide feedback of a user's emotional response. For example, an image of a heart may be mounted on the tablet and a pulsimeter (not shown) attached to the user's wrist. As the user's heart beat varies, a varying signal is fed from the pulsimeter to the computer, which is programmed to display, for example, a pulsating heart whose rate of pulsation mimics the user's heart rate, thereby providing biofeedback to the user. If desired, the fed-back movie sequence shown on the display device may be specially selected to have a calming effect on the user.

The capacitive sensor 30 can be replaced with a conventional pad having a matrix of intersecting switches, whereby depressing on any point of the pad closes one of the switches, thus allowing the x- and y- coordinates to be determined.

According to another application, a 3-dimensional tracker can be employed such as provided by Pegasus Technologies Ltd. under the trade name FreeD. Essentially, an L-shaped bracket is mounted around adjacent edges of the display monitor 24 having ultrasonic transducers at extreme edges of each arm. A third ultrasonic transducer is mounted at the corner of the bracket. A user wear a mobile tracker unit on his or her knuckles having conventional Left and Right mouse-type pushbutton switches. The location of the mobile tracker unit is determined by use of triangulation measurements, in real-time, with an accuracy of approximately 0.2 mm. Button information from the mobile unit is transferred through infra-red signals, enabling the mobile tracker unit to be totally wireless. Such a tracker allows a 3-dimensional object to be grasped by the user and for signal indicating a dimension thereof to be derived. By such means, the computer may be responsive to a selected dimension of the object, or to the span of the object between selected points thereof, for displaying a corresponding movie-sequence. The 3-dimensional object may be a live creature such as a bird whose wing span may be sensed by the rings, thus showing on the display a movie-sequence of a bird in flight, characteristics of which are dependent on the detected wing span, or another desired measurement.

Use of a pulsimeter for measuring the user's pulse has been described. However, other sensors may equally well be used to sense other physiological variables such as temperature, skin resistance and so on. These may be used in like manner to provide biofeedback by controlling the image display or sound sequence according to the measured parameters.

Figures 4A, 4B:
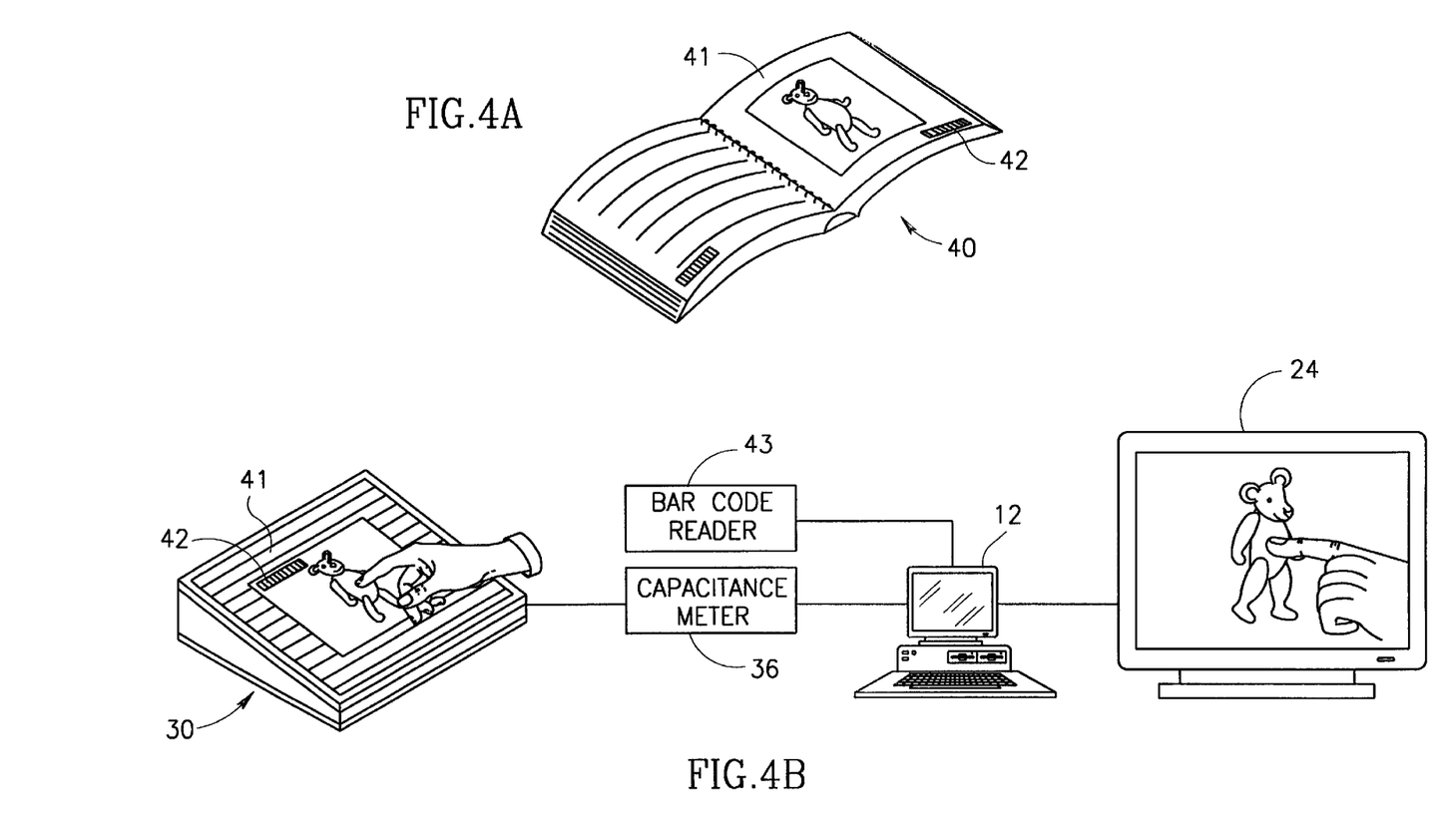

FIGS. 4a and 4b show yet another application of the invention with regard to a "feeling" book 40 each of whose pages is stored at a respective Internet address together with sound and image files. In use, the user accesses the book's Web site so as to receive an introductory home page. In accordance with one embodiment as depicted in FIG. 4a, the pages are removable so that each page can be removed, in turn, and mounted on a tablet of the kind described above with reference to FIG. 3b. Thus, as shown in FIG. 4b, a page 41 of the book is removed from the book 40 and mounted on the capacitive sensor 30. A signal is obtained indicating the new page number which has a corresponding hyperlink at the book's Web site, thus allowing the appropriate sound and image files to be downloaded. In order to identify the current page number, a barcode 42 may be printed on each page for reading by a miniature bar code reader 43 mounted in line of sight proximity to the current page 41 and connected to the computer 12 for feeding data indicative of the current page number thereto.

Pictorial representations depicted on the page allow for movie sequences associated therewith to be displayed upon the reader brushing the picture with his or her finger. This allows interactive animation effects to be played with the reader and for the sensation of feel associated with the external fabric of the pictorial representation to be fed back to the reader. The reader thus feels that real contact is being made with the character shown in the movie sequence.

Figure 5:
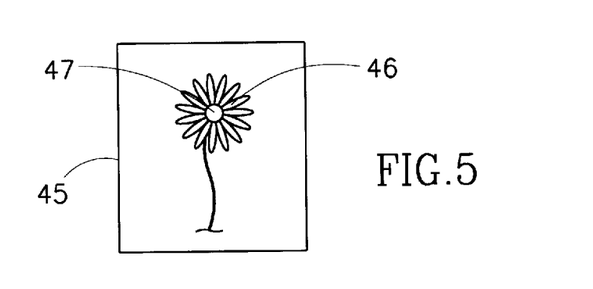

FIG. 5 shows a further embodiment of a card 45 depicting a flower 46 whose petals contain a sealed perfume pod 47 which emits perfume in response to finger pressure. Use of the card 45 is similar to that described above with reference to FIG. 3 of the drawings, allowing for display of a video sequence of the flower blooming. As finger pressure is applied to the petals, perfume is emitted. Here, too, the petals are formed of a material giving the sensation to the user that finger contact is being made with a real flower.

The invention has been described so far inter alia with regard to a card bearing a pictorial representation of an object or person or a feature thereof. It has further been noted that part of the image depicted on such a card may, if required, be shaped to resemble a human body part. However, in accordance with a further embodiment of the invention, the appliance 20 may be shaped in its entirety to resemble a human body part.

Figures 6, 7:
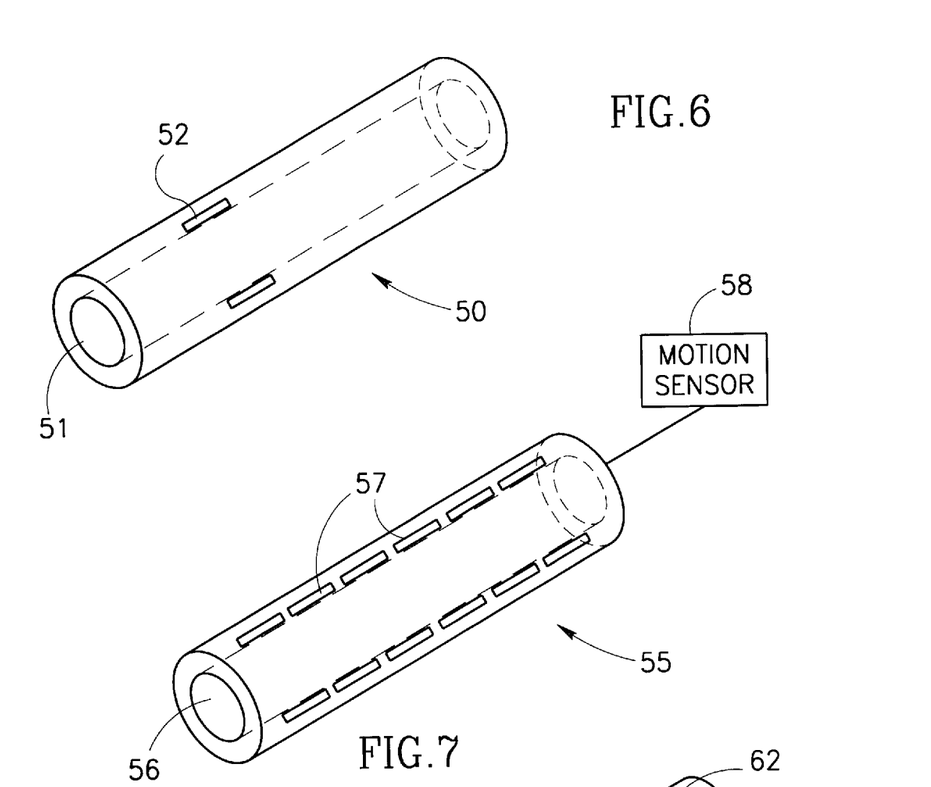

FIG. 6 shows pictorially such an embodiment depicting an appliance 50 having a flexible bore 51 wherein sensors 52 are disposed along an inside surface 53 thereof Such an appliance may serve as a surrogate vagina allowing a user to insert a body member so as to activate the sensors 52 at variable rate and pressure. Preferably, the inside surface of the appliance 50 is formed of an elastic material allowing for radial expansion and contraction depending on the overall width of the body member inserted therein. A male user suffering from impotence, for example, who inserts his penis into the bore will exert pressure against the inside surface of the bore 51 whose magnitude is a function of his penile width. This, in turn, is clearly correlated with the strength of his erection and thus sensor signals are produced which characterize rate of "pumping" and strength of erection. The computer 12 is then programmed to display movie-sequence depicting erotic images which may, for example, mirror the patient's actions in response to tactile stimulation of the appliance. It has been found that such images stimulate the patient further and give rise to greater strength of his erection, thus further increasing the pressure on the sensors 52. The computer may be programmed to display images having stronger erotic content, this inducing yet further stimulation and aiding the patient to reduce anxiety and by such means overcome his impotence.

FIG. 7 shows pictorially an alternative embodiment depicting an appliance 55 having a flexible bore 56 wherein sensors 57 are disposed along a length of an inside surface 58 thereof, so as to provide an indication of depth of penetration of a member inserted therein. Thus, as the user's penis penetrates further into the bore 56, successive sensor signals are produced. The computer may be programmed to display images having stronger erotic content in response to increased penetration, this inducing yet further stimulation and aiding the patient to reduce anxiety and by such means overcome his impotence. In such an embodiment, the sensors 57 may be magnetic reed switches comprising a magnetic reed and a magnet disposed on opposing internal surfaces of the bore 56. In the absence of any obstruction between the magnetic reed and the corresponding magnet, the corresponding switch is closed. When the user's penis enters the bore, it obstructs the magnetic reed and the corresponding magnet thereby opening the corresponding reed switch and affording an indication of the depth or extent of penetration. Since the penis contracts after orgasm, monitoring the depth of penetration allows the moment of orgasm to be determined.

According to another embodiment, both of the appliances 50 and 55 may be provided with motion sensors shown functionally as 58 in FIG. 7 allowing rotation of the appliance to be monitored. Different movie sequences may be stored, at respective hyperlinks, each in respect of a different orientation of the appliance. Upon rotation of the appliance, a respective signal is produced by the motion sensor allowing the orientation of the appliance to be determined and a different one of the movie sequences to be downloaded. This allows for greater flexibility and range of the appliance.

Figure 8:
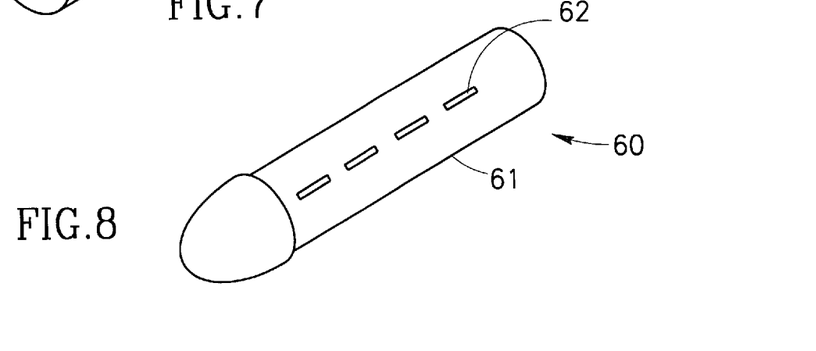

FIG. 8 shows pictorially an alternative embodiment depicting an appliance 60 including a generally cylindrical phallic-shaped member 61 having sensors 62 disposed along an outer surface thereof, for use by female patients in a similar manner. Thus, as the appliance 60 is inserted deeper into the user's vagina, the sensors 62 produce successive signals indicative of depth of penetration. The computer may be programmed responsive to the sensor signals for displaying images having stronger erotic content, this inducing yet further stimulation.

The sensors 62 may be micro-switches whose states (open or closed) are toggled when depressed by the walls of the vagina. Alternatively, or additionally, they may produced signals whose magnitude is a function of electrical resistance, this in turn varying as a function of moisture in the vagina and decreasing in inverse proportion to the woman's stimulation.

The embodiments described above with particular reference to FIGS. 6 to 8 may be supplemented by other sensors such as shown in FIG. 3, in order that the displayed image or the sound track may be varied according to other physiological characteristics. Thus, for example, heart rate as well as body temperature and resistance may be monitored, all of these being indicative of the user's state of arousal: the image or sound track being selected in accordance with a combined function of the measured variables.

Furthermore, the appliances shown in FIGS. 6 to 8 may themselves be provided with actuators responsive to signals which are downloaded together with the movie sequences according to the erotic content thereof, for example. By such means, tactile sensation can be fed back to the user. By way of example, the side walls of the appliance 50 or 55 may be contracted by means of a solenoid which is actuated via a signal downloaded from the web site when the model closes her legs, thereby squeezing the user's penis.

Figure 9:
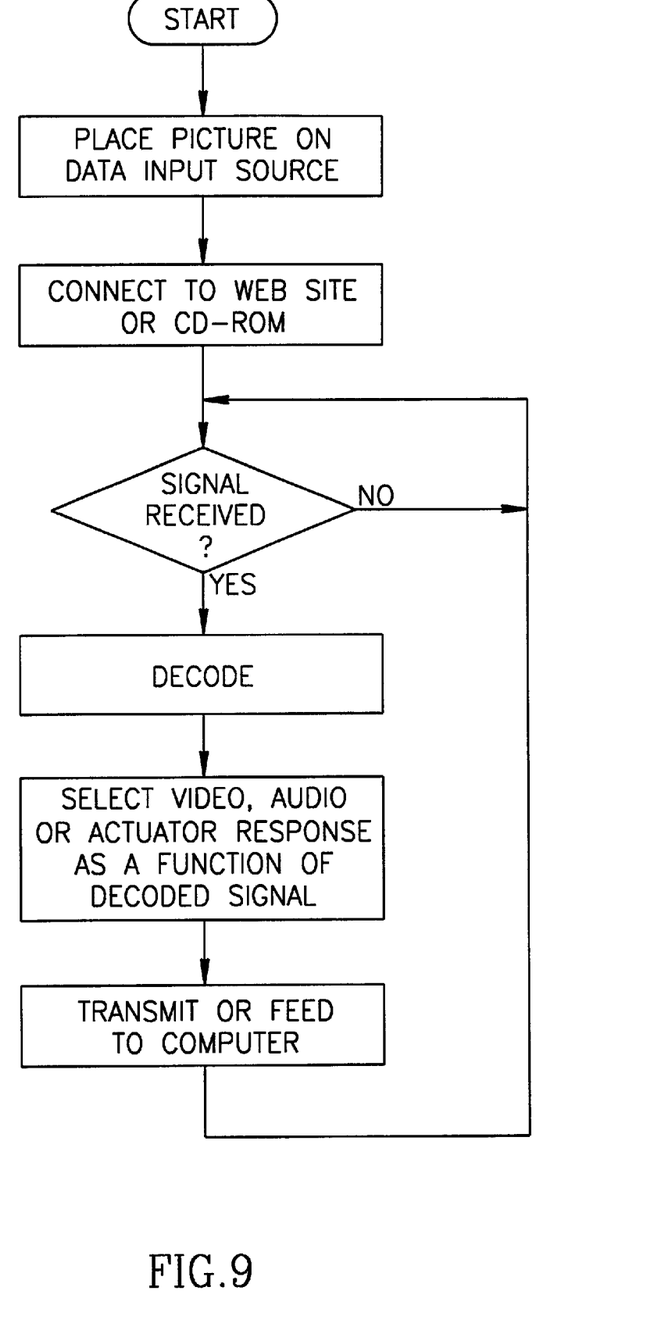
FIG. 9 is a flow diagram showing the principal steps associated with a method for providing tactile feedback using the system depicted in FIG. 1.

FIG. 9 is a flow diagram showing the principal steps associated with use of the invention for downloading selected pages through the Internet. A card or other appliance bearing thereon a pictorial representation is placed on the data entry source and the user connects to the Web site associated with the card or appliance as printed thereon. The Web site downloads a Java™ applet to the user's computer which awaits receipt of a signal from the data entry source. Upon receipt thereof, the signal is decoded and a corresponding file is downloaded to the computer for output. The file may be a graphics file for display on the display device; or a sound file for reproduction via the loudspeaker.

It will be understood that the flow diagram shown in FIG. 8 is simplified and partial. In practice, on connecting to a particular Web site, data is pre-fetched to the user's site thus obviating the need for each page of sound or graphics data to be downloaded from the Web site in direct response to its selection if it already exists in the user's cache. It will also be appreciated that the data can be fed to the user's computer locally via bulk storage media such as CD-ROM or D.V.D. According to one approach, a demo version of the application may be downloaded through the Internet or through the telephone line via a modem and a commercial version on CD-ROM may then be purchased for continued use.

It should also be noted that certain embodiments have been described by way of example and without detailed description of interrelationship between different embodiments. However, features of one embodiment may be combined with those of other embodiments in a manner which will be readily apparent to those skilled in the art and the appended claims are intended to cover such combinations.

It will also be noted that whilst some preferred embodiments have been described with particular regard to downloading computer-accessible movie sequences and other files through the Internet, the files may be stored locally on a CD-ROM, D.V.D. or other locally accessible media.

Finally, it will be understood that the invention may also be implemented via a computer program product and a machine-readable medium allowing a computer to display to a user computer-accessible movie sequences of a predetermined subject in accordance with tactile-dependent signals received from the user. Typically, the computer is a web server coupled via the Internet to a client computer to which images are downloaded for display.

In the method claims that follow, alphabetic characters used to designate claim steps are provided for convenience only and do not imply any particular order of performing the steps.

What is claimed is:

1. A computer-implemented method for giving a user an impression of tactile feedback, the method comprising:
   (a) storing a plurality of computer-accessible movie sequences of at least one image relating to a predetermined subject,
   (b) providing to the user an appliance shaped to resemble a human body part associated with said at least one image,
   (c) using said appliance to input tactile-dependent signals to the computer, and
   (d) displaying on a display device connected to the computer one of said movie-sequences in accordance with said tactile-dependent signals.

2. The method according to claim 1, further including associating a sound-sequence with at least one of the movie-sequences so as to reproduce a sound track with the at least one movie-sequence.

3. The method according to claim 1, further including:
   (e) sensing auxiliary signals representative of respective physiological variables of the user,
   (f) selecting one of the movie-sequences in accordance with a function of the sensed physiological variables.

4. The method according to claim 1, further including:
   (g) receiving actuation signals representative of a specified function of the at least one movie-sequence, and
   (h) controlling an auxiliary property of the appliance with the actuation signals.

5. The method according to claim 1, further including:
   (i) associating with different areas of the appliance a respective object, and
   (j) inputting to the computer a signal indicative of a selected one of the objects upon touching said one of the objects;
   whereby the movie sequence which is displayed in step (d) is associated with the selected object.

6. A computer-implemented system for giving a user an impression of tactile feedback, the system comprising:
   a computer coupled to a memory storing therein a plurality of computer-accessible movie sequences of at least one image relating to a predetermined subject,
   an appliance shaped to resemble a human body part associated with said at least one image,
   at least one data input source associated with the appliance for inputting tactile-dependent signals to the computer, and
   a display device connected to the computer for displaying one of said movie-sequences in accordance with said tactile-dependent signals.

7. The system according to claim 6, including auxiliary sensors for measuring auxiliary signals representative of respective physiological variables of the user, whereby the movie-sequences are selected in accordance with a function of the measured auxiliary signals.

8. The system according to claim 6, wherein:
   a sound-sequence is associated with at least one of the movie-sequences so as to reproduce a sound track with the at least one movie-sequence, and
   a loudspeaker is coupled to the computer for vocalizing the sound-sequence.

9. The system according to claim 6, wherein:
   the appliance includes at least one actuator for controlling an operating characteristic associated therewith, and
   the computer is responsive to the at least one movie-sequence for feeding corresponding actuating signals to the at least one actuator.

10. The system according to claim 6, wherein:

for each of said at least one image relating to a predetermined subject the memory stores therein at least two computer-accessible movie sequences each in respect of a different orientation of the appliance, at least one motion sensor is coupled to the appliance for detecting an orientation thereof, and the computer is responsive to the orientation of the appliance or to a shift in the orientation thereof for selecting a respective one of the at least two computer-accessible movie sequences.

11. The system according to claim 6, wherein the memory is a bulk storage medium such as a CD ROM or D.V.D.

12. The system according to claim 6, wherein the memory is coupled to the computer remotely.

13. The system according to claim 12, wherein the memory is associated with a remote server accessible to the computer via the Internet.

14. A computer program product for operating a computer, comprising a computer processor and a memory for storing a plurality of computer-accessible movie sequences of at least one image relating to a predetermined subject, to displaying to a user connected to the computer desired ones of the computer-accessible movie sequences, said computer program product comprising:

a computer readable medium;

computer program instructions, recorded on the computer readable medium, instructing the computer to receive from an appliance operated by the user and shaped to resemble a human body part a signal representative of said predetermined subject and tactile-dependent signals, and computer program instructions, recorded on the computer readable medium, instructing the computer to display to the user one of said movie-sequences in accordance with said subject and said tactile-dependent signals.

15. A machine readable medium having embodied therein machine readable program code executable by a machine connected to a user interface for receiving from the user a signal representative of a predetermined subject and tactile-dependent signals and for displaying to the user a plurality of computer-accessible movie sequences, computer program instructions, recorded on the machine readable medium, instructing the machine to receive from an appliance operated by the user the user and shaped to resemble a human body part a signal representative of said predetermined subject and tactile-dependent signals, and computer program instructions, recorded on the machine readable medium, instructing the machine to display to the user one of said movie-sequences in accordance with said subject and said tactile-dependent signals.

16. The machine readable medium according to claim 15, further embodying therein data representative of at least some of said computer-accessible movie sequences.

17. A computer-implemented method for providing sexual stimulation, the method comprising:

(a) storing a plurality of computer-accessible erotic movie sequences, (b) providing to the user an appliance depicting or suggestive of a sexual theme, (c) using said appliance to input a sequence of tactile-dependent signals to the computer, and (d) displaying on a display device connected to the computer one of said erotic movie-sequences in accordance with said sequence of tactile-dependent signals.

18. The method according to claim 17, wherein the appliance is associated with a commercial product and the movie-sequences depict different models of said product for aiding in selection or purchase thereof.

19. The method according to claim 17, further including associating a sound-sequence with at least one of the movie-sequences so as to reproduce a sound track with the at least one movie-sequence.

20. The method according to claim 17, further including:

(e) sensing auxiliary signals representative of respective physiological variables of the user, (f) selecting one of the movie-sequences in accordance with a function of the sensed physiological variables.

21. The method according to claims 17, further including:

(g) receiving actuation signals representative of a specified function of the at least one movie-sequence, and (h) controlling an auxiliary property of the appliance with the actuation signals.

22. The method according to claim 17, further including:

(i) associating with different areas of the appliance a respective object, and (j) inputting to the computer a signal indicative of a selected one of the objects upon touching said one of the objects;

whereby the erotic movie sequence which is displayed is associated with the selected object.

23. The method according to claim 17, wherein using said appliance to input tactile-dependent signals to the computer includes:

i) providing at least one flexible area within said appliance, ii) disposing said appliance in predetermined relationship to a keyboard of the computer so that the at least one flexible area overlaps a predetermined sequence of keys of said keyboard, and iii) extracting one of said movie-sequences responsive to depressing said predetermined sequence of keys; whereby applying pressure to the appliance within said at least one flexible area successively depresses said predetermined sequence of keys.

24. The method according to claim 23, wherein the appliance is a substantially planar membrane and step (b) includes depicting on said membrane a pictorial representation of a corresponding one of said movie-sequences.

25. The method according to claim 23, wherein step (d) includes displaying said movie-sequence at a rate dependent on a rate at which successive pressure is applied to said predetermined sequence of keys.

26. The method according to claim 23, wherein a portion of the appliance within said at least one flexible area is contoured.

27. The method according to claim 17, wherein the appliance is associated with a commercial product and the movie-sequences depict different models of said product for aiding in selection or purchase thereof.

28. The method according to claim 26, wherein said portion of the appliance within said at least one flexible area is contoured to resemble a human body part.

29. The method according to claim 17, wherein the appliance is shaped to resemble a human body part.

30. The method according to claim 29, for displaying erotic images in response to tactile stimulation of the appliance.

31. A computer-implemented system for giving a user an impression of tactile feedback, the system comprising:

a computer coupled to a memory storing therein a plurality of computer-accessible erotic movie sequences, an appliance depicting or suggestive of a sexual theme, at least one data input source associated with the appliance for inputting tactile-dependent signals to the computer, and a display device connected to the computer for displaying one of said erotic movie-sequences in accordance with said tactile-dependent signals.

32. The system according to claim 31, wherein the memory is a bulk storage medium such as a CD ROM or D.V.D.

33. The system according to claim 31, wherein the memory is coupled to the computer remotely.

34. The system according to claim 31, wherein:

for each of said at least one image relating to a predetermined subject the memory stores therein at least two computer-accessible movie sequences each in respect of a different orientation of the appliance, at least one motion sensor is coupled to the appliance for detecting an orientation thereof, and the computer is responsive to the orientation of the appliance or to a shift in the orientation thereof for selecting a respective one of the at least two computer-accessible movie sequences.

35. The system according to claims 31, including auxiliary sensors for measuring auxiliary signals representative of respective physiological variables of the user, whereby the movie-sequences are selected in accordance with a function of the measured auxiliary signals.

36. The system according to claim 31, wherein:

a sound-sequence is associated with at least one of the movie-sequences so as to reproduce a sound track with the at least one movie-sequence, and a loudspeaker is coupled to the computer for vocalizing the sound-sequence.

37. The system according to claim 31, wherein:

the appliance includes at least one actuator for controlling an operating characteristic associated therewith, and the computer is responsive to the at least one movie-sequence for feeding corresponding actuating signals to the at least one actuator.

38. The system according to claim 31, wherein:

the appliance includes at least one flexible area within said appliance for overlapping a predetermined sequence of keys of a keyboard of the computer so that applying pressure to the appliance within said at least one flexible area successively depresses said predetermined sequence of keys, and the computer is adapted to extract one of said movie-sequences responsive to depressing said predetermined sequence of keys.

39. The system according to claim 38, wherein the appliance is a substantially planar membrane bearing a pictorial representation of a corresponding one of said movie-sequences.

40. The system according to claim 39, wherein the pictorial representation is associated with a commercial product and the erotic movie-sequences depict different models of said product for aiding in selection or purchase thereof.

41. The system according to claim 38, wherein the computer is adapted to display said movie-sequence at a rate dependent on a rate at which successive pressure is applied to said predetermined sequence of keys.

42. The system according to claim 38, wherein the computer is responsive to at least one point of contact by the user with the appliance for displaying a respective image of said movie-sequence.

43. The system according to claim 39, wherein:

the computer is responsive to successive points of contact by the user with the pictorial representation for displaying a respective successive images of said movie-sequence, and each of the respective successive images depicts contact with the pictorial representation at a respective point of contact so that the movie-sequence mirrors the user's contact with the pictorial representation.

44. The system according to claim 38, wherein the pictorial representation and the movie-sequence depict erotic images.

45. The system according to claim 38, wherein the appliance is a "feeling book".

46. The system according to claim 45, wherein a page number is encoded on each page in barcode format for reading by a barcode reader which produces a corresponding signal for extracting data from a respective location in the memory.

47. The system according to claim 13, wherein a portion of the appliance within said at least one flexible area is contoured.

48. The system according to claim 47, wherein said portion of the appliance within said at least one flexible area is contoured to resemble a human body part.

49. The method according to claim 31, wherein the appliance is shaped to resemble a human body part.

50. The system according to claim 49, wherein the movie-sequence depicts erotic images and the computer is adapted to displaying respective ones of the erotic images in response to tactile stimulation of the appliance.

51. The system according to claim 50, wherein the appliance includes a flexible bore having sensors disposed along an inside surface thereof.

52. The system according to claim 51, wherein said bore is formed of an elastic material allowing for radial expansion and contraction depending on an overall width of a member inserted therein.

53. The system according to claim 51, wherein the sensors are disposed along a length of said bore so as to provide an indication of depth of penetration of a member inserted therein.

54. A method for using the system according to claim 52 by a male inserting his penis into said bore, said method comprising the steps of:

(a) producing pressure-sensitive signals produced by movement of said penis against the inside surface of the bore, said pressure-sensitive signals having a magnitude that is a function of a width of the penis, and (b) displaying erotic images whose content is a function of the magnitude of said pressure-sensitive signals.

55. A method for using the system according to claim 53 by a male inserting his penis into said bore, said method comprising the steps of:

(a) producing successive pressure sensitive signals produced by movement of said penis against the inside surface of the bore indicative of increasing penetration of the penis therethrough, and (b) displaying erotic images whose content is a function of the magnitude of said pressure-sensitive signals.

56. The system according to claim 49, wherein the appliance includes a generally cylindrical member having sensors disposed along an outer surface thereof.

57. A computer-implemented method for giving a user an impression of tactile feedback, the method comprising the steps of:
  (a) storing a plurality of computer-accessible movie sequences of at least one image relating to a predetermined subject,
  (b) providing to the user an appliance associated with said at least one image,
  (c) using said appliance to input tactile-dependent signals to the computer,
  (d) displaying on a display device connected to the computer one of said movie-sequences in accordance with said tactile-dependent signals,
  (e) sensing auxiliary signals representative of a respective physiological variables of the user, and
  (f) selecting one of the movie-sequences in accordance with a function of the sensed physiological variables.

* * * * *